US011852516B2

(12) United States Patent
McAnally et al.

(10) Patent No.: US 11,852,516 B2
(45) Date of Patent: Dec. 26, 2023

(54) METHOD TO DETERMINE WHEN TO VERIFY A STIFFNESS COEFFICIENT OF A FLOWMETER (71) Applicant: MICRO MOTION, INC., Boulder, CO (US)

(72) Inventors: Craig B. McAnally, Thornton, CO (US); Bert J. Downing, Longmont, CO (US)

(73) Assignee: MICRO MOTION, INC., Boulder, CO (US)

( * ) Notice: Subject to any disclaimer, the term of this patent is extended or adjusted under 35 U.S.C. 154(b) by 324 days.

(21) Appl. No.: 17/264,458

(22) PCT Filed: Aug. 13, 2018

(86) PCT No.: PCT/US2018/046484
§ 371 (c)(1),
(2) Date: Jan. 29, 2021

(87) PCT Pub. No.: WO2020/036578
PCT Pub. Date: Feb. 20, 2020

(65) Prior Publication Data
US 2021/0318153 A1 Oct. 14, 2021

(51) Int. Cl.
G01F 1/84 (2006.01)
G01F 25/10 (2022.01)
(52) U.S. Cl.
CPC ............ G01F 1/8436 (2013.01); G01F 25/10 (2022.01)
(58) Field of Classification Search
CPC ................ G01F 1/8436; G01F 25/10
(Continued)

(56) References Cited

U.S. PATENT DOCUMENTS 5,594,180 A 1/1997 Carpenter et al.
9,658,097 B2 5/2017 Berndt et al.
(Continued)

FOREIGN PATENT DOCUMENTS

| CA | 2774131 A1 | 4/2007 |
| WO | 2005050145 A1 | 6/2005 |
| WO | 2007040468 A1 | 4/2007 |

OTHER PUBLICATIONS

Emerson: "Periodic Verification & Calibration of Micro Motion Coriolis Flow Meters", Jun. 20, 2013 (Jun. 20, 2013), XP055586859, Retrieved from the Internet: URL:https://emersonexchange365.com/products/measurement-instrumentation/m/flow-mediagallery/2335/download [retrieved on May 8, 2019].

Primary Examiner — Michael P Nghiem
(74) Attorney, Agent, or Firm — The Ollila Law Group LLC (57) ABSTRACT A method (300) for determining when to verify a stiffness coefficient K (202, 204) in a flowmeter (5) comprising receiving a first stiffness coefficient K (202), a plurality of temperatures T (206), a plurality of response frequencies ω (208), and a plurality of driver currents I (210), determining an average temperature T (212), a standard deviation temperature T (214), an average response frequency ω (216), a standard deviation response frequency ω (218), an average driver current I (224), and a standard deviation driver current I (226). A first subsequent value (236) comprising a subsequent temperature T (228), a subsequent response frequency ω (230), or a subsequent driver current I (232) is received. Upon determining that the first subsequent value (236) is outside a first respective range (237), a determination of a second stiffness coefficient K (204) is initiated.

11 Claims, 6 Drawing Sheets (58) Field of Classification Search
USPC .......................................................... 702/56
See application file for complete search history.

(56) References Cited

U.S. PATENT DOCUMENTS

| | | | |
|---|---|---|---|
| 2008/0234949 A1* | 9/2008 | Stack | G01F 1/8436 |
| | | | 702/48 |
| 2011/0178738 A1 | 7/2011 | Rensing et al. | |
| 2016/0320227 A1* | 11/2016 | Cunningham | G01F 1/84 |
| 2017/0160727 A1 | 6/2017 | Ishikawa et al. | |
| 2018/0216987 A1 | 8/2018 | Rensing | |
| 2023/0243691 A1* | 8/2023 | Cunningham | G01F 25/10 |
| | | | 702/45 |

* cited by examiner

METHOD TO DETERMINE WHEN TO VERIFY A STIFFNESS COEFFICIENT OF A FLOWMETER

TECHNICAL FIELD

The present Application relates to a meter verification and methods to determine when to verify a flowmeter.

BACKGROUND

Vibrating flow tube sensors, such as Coriolis mass flowmeters or vibrating tube densitometers, typically operate by detecting motion of a vibrating flow tube that contains a flowing material. Properties associated with the material in the flow tube, such as mass flow, density and the like, may be determined by processing measurement signals received from motion transducers associated with the flow tube. The vibration modes of the vibrating material-filled system generally are affected by the combined mass, stiffness, and damping characteristics of the containing flow tube and the material contained therein.

A flow tube of a vibratory flowmeter may include one or more flow tubes. A flow tube is forced to vibrate at a resonant frequency, where the resonant frequency of the tube is proportional to the density of the fluid in the flow tube. Pick-offs located on the inlet and outlet sections of the tube measure the relative vibration between the ends of the tube. During flow, the vibrating tube and the flowing mass couple together due to Coriolis forces, causing a phase shift in the vibration between the ends of the tube. The phase shift is directly proportional to the mass flow.

A typical Coriolis mass flowmeter includes one or more flow tubes that are connected inline in a pipeline or other transport system and convey material, e.g., fluids, slurries and the like, in the system. Each flow tube may be viewed as having a set of natural vibration modes including, for example, simple bending, torsional, radial, and coupled modes. In a typical Coriolis mass flow measurement application, a flow tube is excited in one or more vibration modes as a material flows through the flow tube, and motion of the flow tube is measured at points spaced along the flow tube. Excitation is typically provided by a driver, e.g., an electromechanical device, such as a voice coil-type driver, that perturbs the flow tube in a periodic fashion. Mass flow rate may be determined by measuring time delay or phase differences between motions at the pick-off locations. Two such pick-offs are typically employed in order to measure a vibrational response of the flow tube or flow tubes, and are typically located at positions upstream and downstream of the actuator. The two pick-off sensors are connected to electronic instrumentation by cabling. The instrumentation receives signals from the two pick-off sensors and processes the signals in order to derive a mass flow rate measurement.

The phase difference between the two sensor signals is related to the mass flow rate of the material flowing through the flow tube or flow tubes. The mass flow rate of the material is proportional to the time delay between the two sensor signals, and the mass flow rate may therefore be determined by multiplying the time delay by a flow calibration factor (FCF), where the time delay comprises a phase difference divided by frequency. The FCF reflects the material properties and cross-sectional properties of the flow tube. In the prior art, the FCF is determined by a calibration process prior to installation of the flowmeter into a pipeline or other flow tube. In the calibration process, a fluid is passed through the flow tube at a given flow rate and the proportion between the phase difference and the flow rate is calculated.

The FCF is related to a stiffness characteristic of the meter assembly. If the stiffness characteristic K of the meter assembly changes, then the FCF will also change. Changes therefore will affect the accuracy of the flow measurements generated by the flowmeter. Changes in the material and cross-sectional properties of a flow tube may be caused by erosion or corrosion, for example.

Consequently, there is a need to track the stiffness coefficient K of the flowmeter flow tubes to detect and/or quantify any changes to the stiffness of the meter assembly in order to maintain a high level of accuracy in the flowmeter to determine if the FCF has changed. Running a meter verification routine allows operators to conveniently check the calibration of a meter.

In order to receive the benefit of meter verification, operators need to schedule it. Ordinarily, meter verification is performed at pre-scheduled regular intervals, or as down-time opportunities arise around processes. Because processes are sometimes operated around the clock, sometimes it is hard to identify a convenient time to run the meter verification routine, or the operator misses opportunities to do so. When this happens, relatively long amounts of time may pass between meter verifications. During that time, changes in stiffness coefficient K may not be accounted for between meter verifications, and this may impact the flowmeter accuracy.

At other times, the meter verification routine may be run when the meter stiffness has not changed. Meter verification can be processor intensive and somewhat disruptive, however. The operator has no way to determine when it is probable that the meter stiffness may have changed, and therefore the operator must continue to verify the stiffness frequently, even when it is unlikely that the meter stiffness has changed.

What is needed is a way to identify when it is likely that the stiffness of a meter may have changed, so that meter verification may be run on an as-needed basis.

SUMMARY

According to a first aspect, a method for determining when to verify a stiffness coefficient K in a flowmeter is provided. The method comprises receiving a first stiffness coefficient K. The method further comprises receiving a plurality of temperatures T, a plurality of response frequencies ω, and a plurality of driver currents I. The method further comprises determining an average temperature T and a standard deviation temperature T based on the plurality of temperatures T. The method further comprises determining an average response frequency ω and a standard deviation response frequency ω based on the plurality of response frequencies ω. The method further comprises determining an average driver current I and a standard deviation driver current I based on the plurality of driver currents I. The method further comprises receiving a first subsequent value, the first subsequent value comprising a subsequent temperature T, a subsequent response frequency ω, or a subsequent driver current I. Upon determining that the first subsequent value is outside a first respective range defined between a first respective average minus a first respective threshold, and the first respective average plus the first respective threshold, the method further comprises initiating a determination of a second stiffness coefficient K.

According to a second aspect, a meter electronics for a flowmeter is provided. The meter electronics comprises an interface for receiving a vibrational response from the flowmeter, and a processing system in communication with the interface. The processing system is configured to receive a first stiffness coefficient K. The processing system is further configured to receive a plurality of temperatures T, a plurality of response frequencies $\omega$, and a plurality of driver currents I. The processing system is further configured to determine an average temperature T and a standard deviation temperature T based on the plurality of temperatures T. The processing system is further configured to determine a subsequent response frequency $\omega$ and a standard deviation response frequency $\omega$ based on the plurality of response frequencies $\omega$. The processing system is further configured to determine an average driver current I and a standard deviation driver current I based on the plurality of driver currents I. The processing system is further configured to receive a first subsequent value, the first subsequent value comprising a subsequent temperature T, a subsequent response frequency $\omega$, or a subsequent driver current I. Upon determining that the first subsequent value is outside a first respective range defined between a first respective average minus a first respective threshold, and the first respective average plus the first respective threshold, the processing system is further configured to initiate a determination of a second stiffness coefficient K.

According to a third aspect, a system for determining when to verify a stiffness coefficient K of a flowmeter is provided. The system comprises a stiffness coefficient K module, a learning module, and a monitoring module. The stiffness coefficient K module is configured to determine a first stiffness coefficient K and to determine a second stiffness coefficient K. The learning module is configured to receive a plurality of temperatures T, a plurality of response frequencies $\omega$, and a plurality of driver currents I, determine an average temperature T and a standard deviation temperature T based on the plurality of temperatures T, determine a subsequent response frequency $\omega$ and a standard deviation response frequency $\omega$ based on the plurality of response frequencies $\omega$, and determine an average driver current I and a standard deviation driver current I based on the plurality of driver currents I. The monitoring module is configured to receive a first subsequent value, the first subsequent value comprising a subsequent temperature T, a subsequent response frequency $\omega$, or a subsequent driver current I, and upon determining that the first subsequent value is outside a first respective range defined between a first respective average minus a first respective threshold, and the first respective average plus the first respective threshold, initiate a determination of a second stiffness coefficient K.

Aspects

In a further aspect, the plurality of temperatures T, the plurality of response frequencies $\omega$, and the plurality of driver currents I may be determined concurrently with the determination of the first stiffness coefficient K.

In a further aspect, the first respective threshold may comprise multiplying a respective standard deviation by a predetermined factor.

In a further aspect, the method may further comprise receiving at least a second subsequent value comprising the subsequent temperature T, the subsequent response frequency $\omega$, or the subsequent driver current I, the second subsequent value being different from the first subsequent value, wherein determining that the first subsequent value is outside the first respective range may further comprise determining that the second subsequent value is outside a second respective range defined between a second respective average minus a second respective threshold, and the second respective average plus the second respective threshold.

In a further aspect, the method may further comprise receiving at least a third subsequent value comprising the subsequent temperature T, the subsequent response frequency $\omega$, or the subsequent driver current I, the third subsequent value being different from the second subsequent value and the first subsequent value, and wherein determining that the first subsequent value is outside the first respective range may further comprise determining that the third subsequent value is outside a third respective range defined between a third respective average minus a third respective threshold, and the third respective average plus the third respective threshold.

In a further aspect, at least one of receiving the first stiffness coefficient K or initiating the determination of the second stiffness coefficient K may further comprise receiving a vibrational response from the flowmeter, with the vibrational response comprising a response to a vibration of the flowmeter at a substantially resonant frequency, determining a vibrational response frequency $\omega$, determining a vibrational response voltage V and a vibrational response drive current I, measuring a decay characteristic of the flowmeter, and determining the stiffness coefficient K from the vibrational response frequency $\omega$, the vibrational response voltage V, the vibrational response drive current I, and the decay characteristic.

In a further aspect, the plurality of temperatures T, the plurality of response frequencies $\omega$, and the plurality of driver currents I may be determined concurrently with the determination of the first stiffness coefficient K.

In a further aspect, the first respective threshold may comprise multiplying a first respective standard deviation by a predetermined factor.

In a further aspect, the processing system may be further configured to receive at least a second subsequent value comprising the subsequent temperature T, the subsequent response frequency $\omega$, or the subsequent driver current I, the second subsequent value being different from the first subsequent value, and wherein determining that the first subsequent value is outside the first respective range may further comprise determining that the second subsequent value is outside a second respective range defined between a second respective average minus a second respective threshold, and the second respective average plus the second respective threshold.

In a further aspect, the processing system may be further configured to receive at least a third subsequent value comprising the subsequent temperature T, the subsequent response frequency $\omega$, or the subsequent driver current I, the third subsequent value being different from the second subsequent value and the first subsequent value, and wherein determining that the first subsequent value is outside the first respective range may further comprise determining that the third subsequent value is outside a third respective range defined between a third respective average minus a third respective threshold, and the third respective average plus the third respective threshold.

In a further aspect, at least a first of receiving the first stiffness coefficient K and initiating the determination of the second stiffness coefficient K may further comprise receiving a vibrational response from the flowmeter, with the vibrational response comprising a response to a vibration of the flowmeter at a substantially resonant frequency, determining a vibrational response frequency $\omega$, determining a vibrational response voltage V and a vibrational response drive current I, measuring a decay characteristic ζ of the flowmeter, and determining a stiffness coefficient K from the vibrational response frequency ω, the vibrational response voltage V, the vibrational response drive current I, and the decay characteristic ζ.

In a further aspect, the plurality of temperatures T, the plurality of response frequencies ω, and the plurality of driver currents I may be determined concurrently with the determination of the first stiffness coefficient K.

In a further aspect, the first respective threshold may comprise multiplying a first respective standard deviation by a predetermined factor.

In a further aspect, the monitoring module may be further configured to receive at least a second subsequent value comprising the subsequent temperature T, the subsequent response frequency ω, or the subsequent driver current I, the second subsequent value being different from the first subsequent value, and wherein determining that the first subsequent value is outside the first respective range may further comprise determining that the second subsequent value is outside a second respective range defined between a second respective average minus a second respective threshold, and the second respective average plus the second respective threshold.

In a further aspect, the monitoring module may be further configured to receive at least a third subsequent value comprising the subsequent temperature T, the subsequent response frequency ω, or the subsequent driver current I, the third subsequent value being different from the second subsequent value and the first subsequent value, and wherein determining that the first subsequent value is outside the first respective range may further comprise determining that the third subsequent value is outside a third respective range defined between a third respective average minus a third respective threshold, and the third respective average plus the third respective threshold.

In a further aspect, the stiffness coefficient K module may be further configured to receive a vibrational response from the flowmeter, with the vibrational response comprising a response to a vibration of the flowmeter at a substantially resonant frequency, determine a vibrational response frequency ω, determine a vibrational response voltage V and a vibrational response drive current I, measure a decay characteristic ζ of the flowmeter, and determine the stiffness coefficient K from the vibrational response frequency ω, the vibrational response voltage V, the vibrational response drive current I, and the decay characteristic ζ.

BRIEF DESCRIPTION OF THE DRAWINGS

The same reference number represents the same element on all drawings.

DETAILED DESCRIPTION

The present Application describes a method for determining when to verify a stiffness coefficient of a flowmeter, a meter electronics for performing said method, and a system for performing the same.

Figure 1:
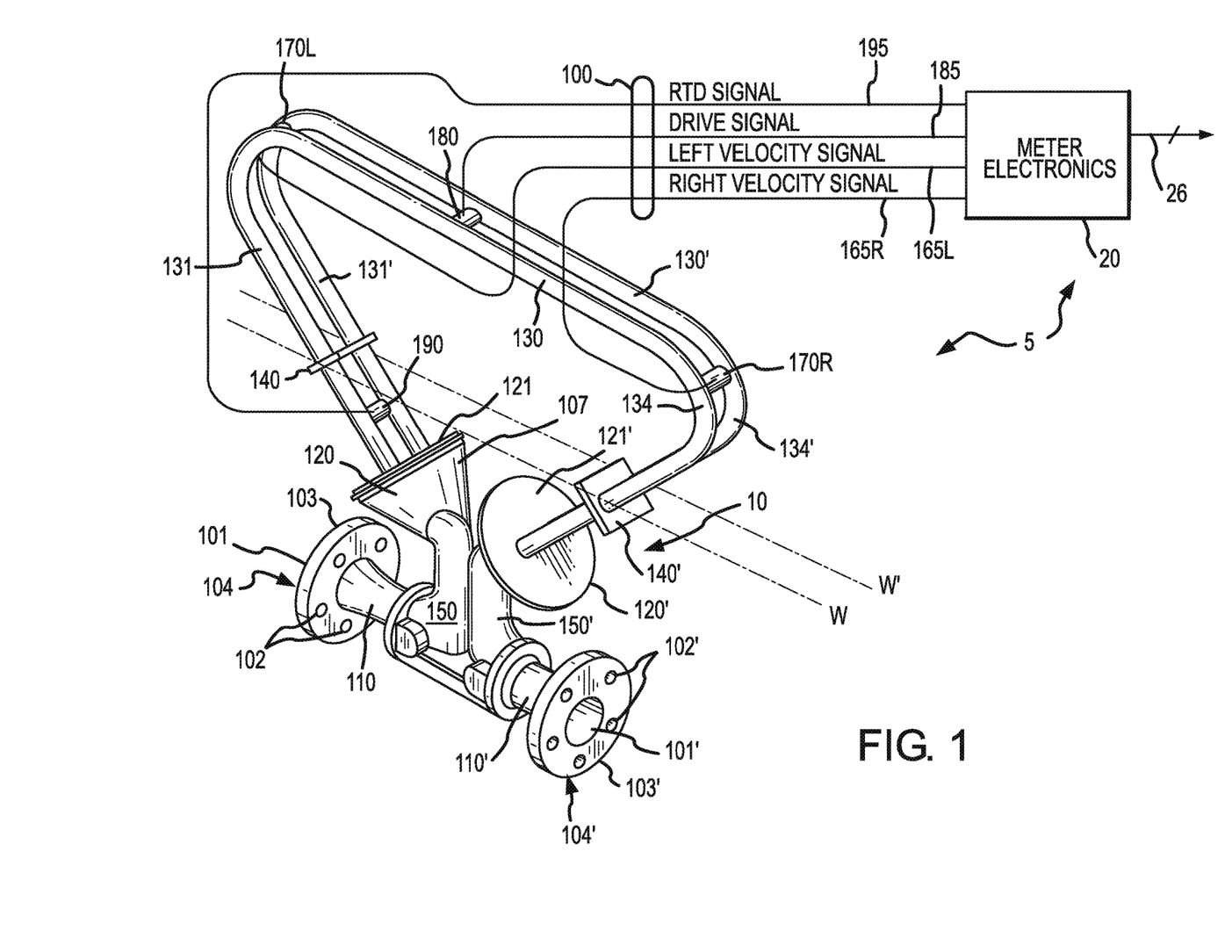
FIG. 1 depicts a flowmeter according to an example of the Application.

FIG. 1 depicts a flowmeter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present Application. A Coriolis flowmeter structure is described although it is apparent to those skilled in the art that the present Application could be practiced as a vibrating tube densitometer without the additional measurement capability provided by a Coriolis mass flowmeter.

Meter assembly 10 includes a pair of manifolds 150 and 150', flanges 103 and 103' having flange necks 110 and 110', a pair of parallel flow tubes 130 and 130', driver 180, temperature sensor 190, and a pair of velocity pick-off sensors 170L and 170R. Flow tubes 130 and 130' have two essentially straight side legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through meter assembly 10.

When flanges 103 and 103', having holes 102 and 102' are connected, via inlet end 104 and exit end 104' into a process line (not shown) which carries the process material that is being measured, material enters inlet end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'.

Inasmuch as the Young's modulus of the flow tubes change with temperature, and this change affects the calculation of flow and density, resistive temperature detector (RTD) temperature sensor 190 is mounted to flow tube 130', to continuously measure the temperature of the flow tube. The temperature of the flow tube and hence the voltage appearing across the RTD for a given current passing through is governed by the temperature of the material passing through the flow tube. The temperature dependent voltage appearing across the RTD is used in a well-known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flowmeter. This driver 180 may comprise any one of many well-known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to driver 180.

Meter electronics 20 receives the RTD temperature signal on lead 195, and the left and right velocity signals appearing on leads 165L and 165R, respectively. Meter electronics 20 produces the drive signal appearing on lead 185 to driver 180 and vibrate flow tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means.

A mass flow rate of material flowing through the flowmeter is determined by multiplying a measured time delay (or phase difference/frequency) by the flow calibration factor (FCF). The FCF may reflect the material properties and cross-sectional properties of the flow tube. The FCF is related to a stiffness characteristic of the meter assembly. If the stiffness characteristic of the meter assembly changes, then the FCF will also change. Changes in the stiffness of the flowmeter therefore will affect the accuracy of the flow measurements generated by the flowmeter.

The vibrational response of a flowmeter may be represented by an open loop, second order drive model, comprising:

$$M\ddot{x}+C\dot{x}+Kx=f \qquad (1)$$

where f is the force applied to the system, M is a mass of the system, C is a damping characteristic, and K is a stiffness characteristic of the system. The term K comprises $K=M(\omega_0)^2$ and the term C comprises $C=M2\zeta\omega_0$, where $\zeta$ comprises a decay characteristic, and $\omega_0=2\pi f_0$ where $f_0$ is the natural/resonant frequency of the meter assembly 10 in Hertz. In addition, x is the physical displacement distance of the vibration, $\dot{x}$ is the velocity of the flowtube displacement, and $\ddot{x}$ is the acceleration. This is commonly referred to as the MCK model. This formula may be rearranged into the following form:

$$M[s^2+2\zeta\omega_0 s+\omega_0^2]x=f \qquad (2)$$

Equation (2) may be further manipulated into a transfer function form. In the transfer function form, a term of displacement over force is used, comprising:

$$\frac{x}{f} = \frac{s}{M[s^2+2\zeta\omega_0 s+\omega_0^2]} \qquad (3)$$

Magnetic relationships may be applied to simplify Equation (3). Two applicable equations are:

$$V=BL_{PO} \times \dot{x} \qquad (4)$$

and $$f=BL_{DR} \times I \qquad (5)$$

The sensor voltage V of Equation (4) (at a pick-off sensor 170L or 170R) is equal to the pick-off sensitivity factor $BL_{PO}$ multiplied by the pick-off velocity of motion $\dot{x}$. The pick-off sensitivity factor $BL_{PO}$ is generally known or measured for each pick-off sensor. The force f generated by the driver 180 of Equation (5) is equal to the driver sensitivity factor $BL_{DR}$ multiplied by the drive current I supplied to the driver 180. The driver sensitivity factor $BL_{DR}$ of the driver 180 is generally known or measured. The factors $BL_{PO}$ and $BL_{DR}$ are both a function of temperature, and may be corrected by a temperature measurement.

By substituting the magnetic relationships from Equations (4) and (5) into the transfer function of Equation (3), the following equation may be obtained:

$$\frac{V}{I} = \frac{BL_{PO}*BL_{DR}*s}{M[s^2+2\zeta\omega_0 s+\omega_0^2]} \qquad (6)$$

If the meter assembly 10 is driven open loop on resonance, i.e., at a resonant/natural frequency $\omega_0$ (where $\omega_0=2\pi f_0$), then Equation (6) may be rewritten as:

$$\left(\frac{V}{I}\right)_{\omega_0} = \frac{BL_{PO}*BL_{DR}*\omega_0}{2\zeta[M\omega_0^2]} \qquad (7)$$

By substituting for stiffness, Equation (7) is simplified to:

$$\left(\frac{V}{I}\right)_{\omega_0} = \frac{BL_{PO}*BL_{DR}*\omega_0}{2\zeta K} \qquad (8)$$

Here, the stiffness coefficient K may be isolated in order to obtain:

$$K = \frac{I*BL_{PO}*BL_{DR}*\omega_0}{2\zeta V} \qquad (9)$$

As a consequence, by measuring/quantifying the decay characteristic $\zeta$, along with the drive voltage V and drive current I, the stiffness coefficient K may be determined. The response voltage V from the pick-offs may be determined from the vibrational response, along with the drive current I. The process of determining the stiffness coefficient K is discussed in more detail in conjunction with FIG. 4, below.

The stiffness coefficient may be tracked over time to verify meter accuracy. A change in the stiffness coefficient K may indicate that the FCF for the particular flowmeter has changed. The stiffness coefficient K may be obtained solely from vibrational responses of the flowmeter. Tracking changes in the stiffness coefficient K may allow for detection of changes in the meter and re-calibration without a need for a disruptive factory calibration process.

Figure 2:
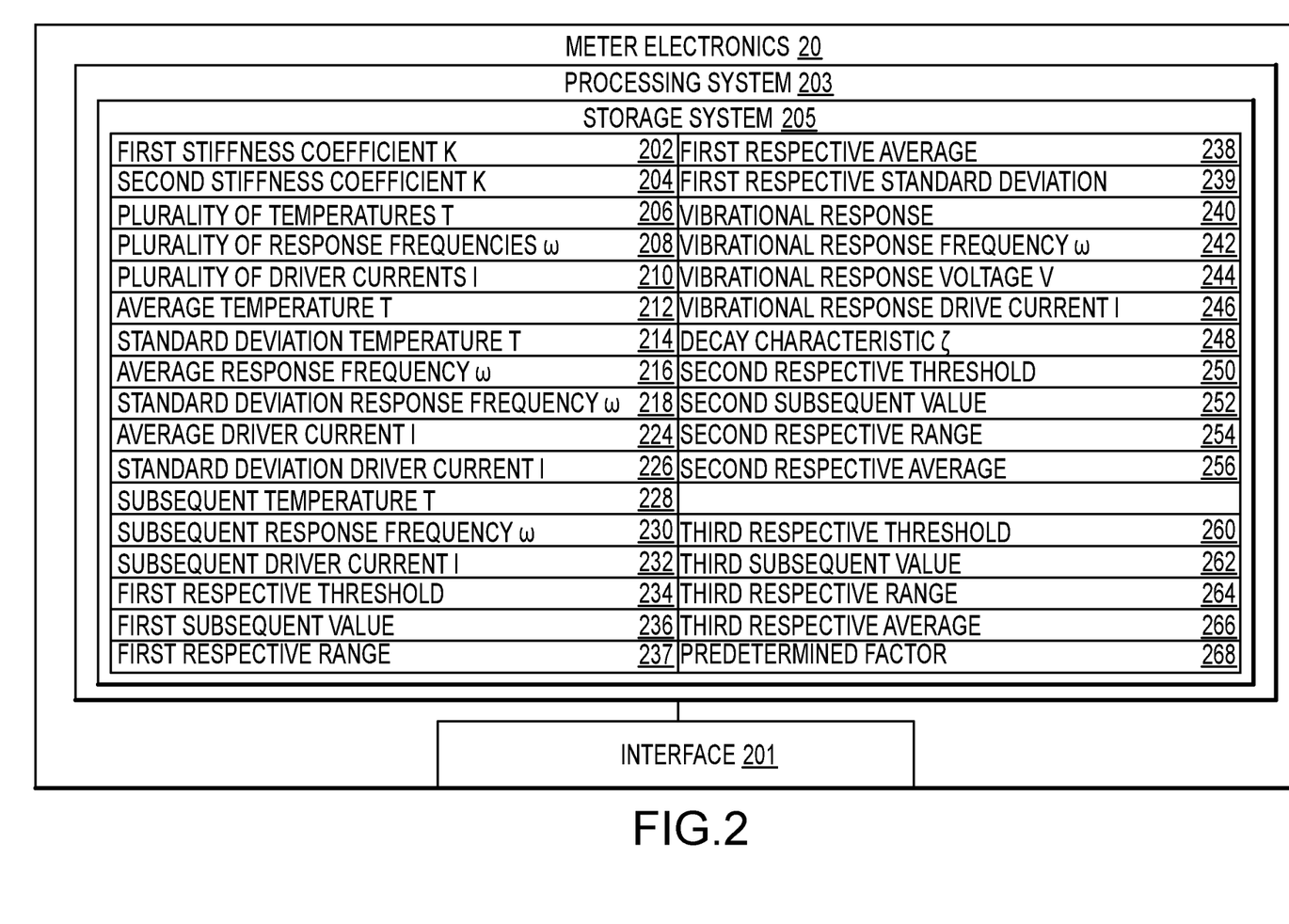
FIG. 2 depicts meter electronics according to an example of the Application.

FIG. 2 depicts the meter electronics 20 according to an embodiment. The meter electronics 20 includes an interface 201 and a processing system 203. The meter electronics 20 receives a vibrational response 240, such as from the meter assembly 10, for example. The meter electronics 20 processes the vibrational response 240 in order to obtain flow characteristics of the flow material flowing through the meter assembly 10. In addition, in the meter electronics 20 according to an example, the vibrational response 240 is also processed in order to determine a stiffness coefficient K of the meter assembly 10. Furthermore, the meter electronics 20 may process two or more such vibrational responses, over time, in order to detect a stiffness coefficient change ΔK in the meter assembly 10. The stiffness coefficient K determination may be made under flow or no-flow conditions. A no-flow stiffness coefficient K determination may offer the benefit of a reduced noise level in the resulting vibrational response.

The interface 201 receives the vibrational response 240 from one of the pick-off sensors 170L and 170R via the leads 100 of FIG. 1. The interface 201 may perform any necessary or desired signal conditioning, such as any manner of formatting, amplification, buffering, etc. Alternatively, some or all of the signal conditioning may be performed in the processing system 203. In addition, the interface 201 may enable communications between the meter electronics 20 and external devices. The interface 201 may be capable of any manner of electronic, optical, or wireless communication.

The interface 201 in one embodiment is coupled with a digitizer (not shown), wherein the sensor signal comprises an analog sensor signal. The digitizer samples and digitizes an analog vibrational response and produces a digital vibrational response 240.

The processing system 203 conducts operations of the meter electronics 20 and processes flow measurements from the meter assembly 10. The processing system 203 executes one or more processing routines and thereby processes the flow measurements in order to produce one or more flow characteristics.

The processing system 203 may comprise a general purpose computer, a microprocessing system, a logic circuit, or some other general purpose or customized processing device. The processing system 203 may be distributed among multiple processing devices. The processing system 203 may include any manner of integral or independent electronic storage medium, such as the storage system 205.

The storage system 205 may store flowmeter parameters and data, software routines, constant values, and variable values. In one embodiment, the storage system 205 includes routines that are executed by the processing system 203.

In one embodiment, the storage system 205 stores variables, constants, coefficients, and working variables used to operate the flowmeter 5. For example, the storage system 205 may store a first stiffness coefficient K 202, a second stiffness coefficient K 204, a plurality of temperatures T 206, a plurality of response frequencies ω 208, a plurality of driver currents I 210, an average temperature T 212, a standard deviation temperature T 214, an average response frequency ω 216, a standard deviation response frequency ω 218, an average driver current I 224, a standard deviation driver current I 226, a subsequent temperature T 228, a subsequent response frequency ω 230, a subsequent driver current I 232, a first respective threshold 234, first subsequent value 236, first respective range 237, first respective average 238, first respective standard deviation 239, vibrational response 240, vibrational response frequency ω 242, vibrational response voltage V 244, vibrational response drive current I 246, decay characteristic ζ 248, second respective threshold 250, second subsequent value 252, second respective range 254, second respective average 256, third respective threshold 260, third subsequent value 262, third respective range 264, third respective average 266, and predetermined factor 268, as will be described below.

Figure 3A:
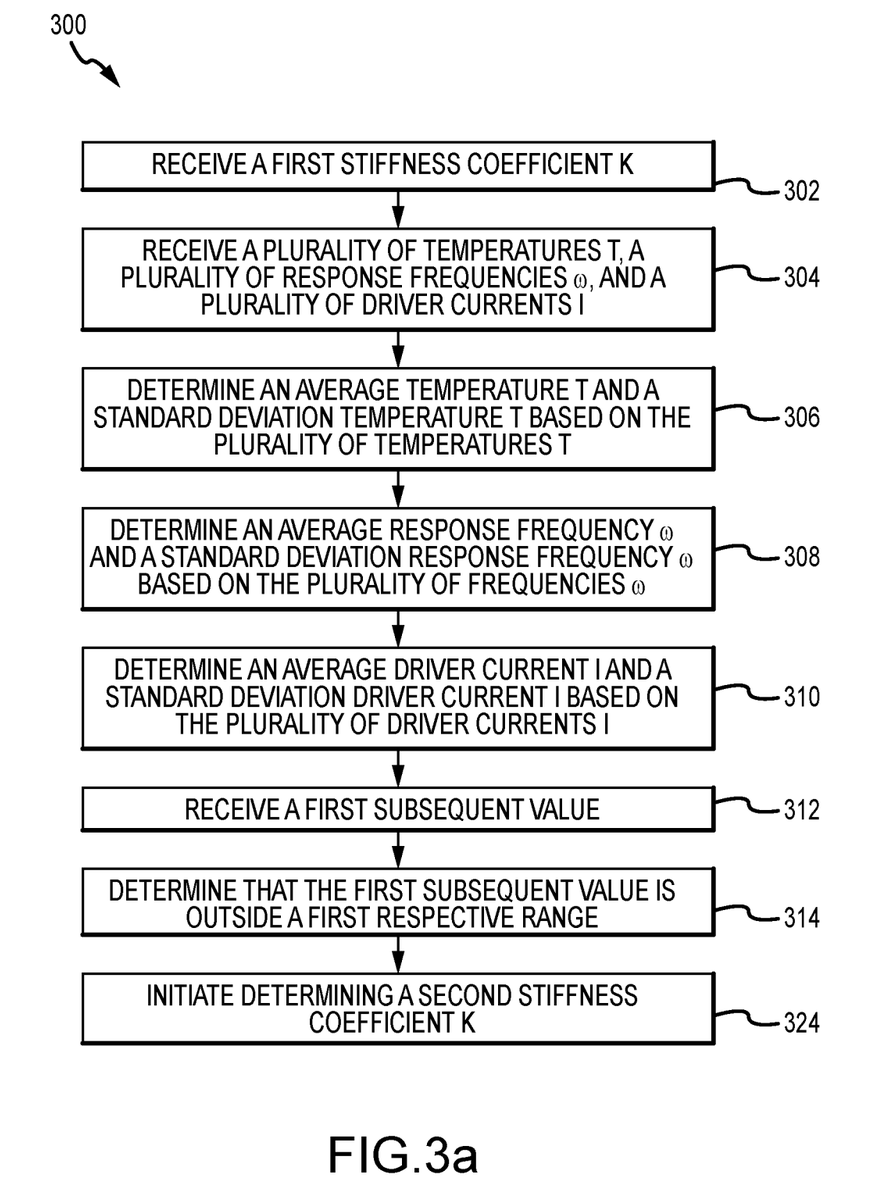
FIG. 3a depicts a flowchart depicting a method according to an example of the Application.

FIG. 3a depicts method 300, in accordance with an example. Method 300 may be used to determine when to verify the stiffness coefficient K of a flowmeter.

Method 300 begins with step 302. In step 302, a first stiffness coefficient K 202 is received. In examples, the first stiffness coefficient K 202 may be received at processing system 203 and stored at storage system 205. In further examples, however, first stiffness coefficient K 202 may be determined by processing system 203, as will be further described below.

Method 300 continues with step 304. In step 304, a plurality of temperatures T 206, a plurality of response frequencies ω 208, and a plurality of driver currents I 210 are received. For example, the plurality of temperatures T 206 may be a time series of temperatures determined using temperature sensor 190, the plurality of response frequencies ω 208 may be a time series of response frequencies ω determined using pick offs 170L and 170R upon vibrating meter assembly 10, and the plurality of driver currents I 210 may be a time series of driver currents I determined for driver 180. In examples, the plurality of temperatures T 206, the plurality of response frequencies ω 208, and the plurality of driver currents I 210 may include time stamps over a concurrent time period.

In examples, the plurality of temperatures T 206, the plurality of frequencies ω 208, and the plurality of driver currents I 210 may be determined concurrently with the determination of the first stiffness coefficient K 202. This may allow the plurality of temperatures T 206, the plurality of frequencies ω 208 and the plurality of driver currents I 210 to better represent the flowmeter conditions during the determination of the first meter stiffness coefficient K 202.

Method 300 continues with steps 306, 308, and 310. In step 306, an average temperature T 212 and a standard deviation temperature T 214 are determined based on the plurality of temperatures T 206. In step 308, an average response frequency ω 216 and a standard deviation response frequency ω 218 are determined based on the plurality of response frequencies ω 208. In step 310, an average driver current I 224 and a standard deviation driver current I 226 are determined based on the plurality of driver currents I 210. The first stiffness coefficient K 202, the average temperature T 212, the standard deviation temperature T 214, the average response frequency ω 216, the standard deviation response frequency ω 218, the average driver current I 224, and the standard deviation driver current I 226 may all help define a flowmeter region of operation, which is correlated to the meter conditions in a particular environment at a particular time.

TABLE 1

| Region of operation | Stiffness coefficient K. | Avg temperature T (C.) | Std temperature T (C.) | Avg ω (Hz) | Std ω (Hz) | Avg I (A) | Std I (A) |
|---|---|---|---|---|---|---|---|
| 1 | 15432 | 43 | 2 | 100.23 | 0.03 | 2 | 0.01 |
| 2 | 15425 | 25 | 1 | 99.87 | 0.01 | 1.94 | 0.01 |

Table 1 provides a first and second example region of operation, and their respective stiffness coefficients K, average temperatures T 212, standard deviation temperatures T 214, average response frequencies ω 216, standard deviation response frequencies ω 218, average driver current I 224, and standard deviation driver currents I 226. In an example, the first stiffness coefficient K 202 may be the stiffness coefficient K associated with the first region of operation in Table 1.

Method 300 continues with step 312. In step 312, a first subsequent value 236 is received. The first subsequent value 236 comprises a subsequent temperature T 228, a subsequent response frequency ω 230, or a subsequent driver current I 232. In examples, the subsequent temperature T 228, the subsequent response frequency ω 230, or the subsequent driver current I 232 may be determined after the first region of operation has been determined. In other words, the subsequent temperature T 228, the subsequent response frequency ω 230, or the subsequent driver current I 232 may be associated with a timestamp that is subsequent to, and not concurrent with, the time stamps associated with the first stiffness coefficient K 202, the plurality of temperatures T 206, the plurality of response frequencies ω 208, or the plurality of driver currents I 210 used to define the first region of operation of Table 1.

Method 300 continues with step 314. In step 314, the first subsequent value 236 is determined to be between a first respective average 238 minus a first respective threshold 234 and the first respective average 238 plus the first respective threshold 234.

The first respective average 238 is the average value corresponding to the first subsequent value 236, either the average temperature T 212, the average response frequency ω 216, or the average driver current I 224. For example, if the subsequent temperature T 228 is being evaluated, then the first respective average 238 is the average temperature T 212.

The first respective threshold 234 defines the first respective range 237 around the first respective average 238 that is within the region of operation. The first respective threshold 234 may be any number operable to define the first respective range 237 when added to and subtracted from a subsequent value, as will be understood by those of skill.

Step 314 may help determine when the first subsequent value 236 received, or the at least one of the subsequent temperature T 228, the subsequent response frequency ω 230, or the subsequent driver current I 232, is outside the first respective threshold 234 from first subsequent value 236 received. In such cases, the flowmeter 5 may be outside the first region of operation.

In examples, the first respective threshold 234 may be determined by multiplying a first respective standard deviation 239 by a predetermined factor 268.

The first respective standard deviation 239 may be whichever standard deviation, including the standard deviation temperature T 214, the standard deviation response frequency ω 218, or the standard deviation driver current I 226, is associated with the first subsequent value 236 received.

The predetermined factor 268 may comprise any number used to define the region of operation around a first respective average 238. In examples, the predetermined factor 268 may be the same for each of the average temperature T 212, the average response frequency ω 216, or the average driver current I 224. In further examples, however, the temperature T, response frequency ω, or driver current I may each correspond to a different respective predetermined factor 268.

For example, if the predetermined factor 268 is 1.5, and the first subsequent value 236 received is subsequent temperature T 228, then for the first region of operation defined in Table 1, the first respective threshold 234 will be 3, or the standard deviation temperature T 214 times the predetermined factor 268, 2*1.5. By allowing the first respective threshold 234 to be configured via the predetermined factor 268, it may be possible to adjust the amount of a possible drift in the first stiffness coefficient K 202 that may initiate a new verification of the stiffness coefficient K.

Method 300 continues with step 324. In step 324, the determination of a second stiffness coefficient K 204 is initiated. In examples, a routine to determine the second stiffness coefficient K 204 may be executed by processing system 203. In further examples, however, second stiffness coefficient K 204 may be determined by an additional meter electronics (not pictured). In examples, the method to determine the second stiffness coefficient K 204 may be substantially the same as the method to determine the first stiffness coefficient K 202.

Step 324 may initiate the identification of a second, newer region of operation. For example, step 324 may initiate identifying the second region of operation represented in Table 1. In example Table 1, it may be seen that, compared to the first region of operation, the second region of operation includes a second stiffness coefficient K 204 that is lower than the first stiffness coefficient K 202 of the first region of interest. The average temperature T 212, average response frequency ω 216, and average driver current I 224 for the second region of operation are also lower than those of the first region of operation.

After step 324, steps of method 300 may be repeated to facilitate further monitoring of the flowmeter. For example, steps 304, 306, 308, and 310 may be performed to determine the parameters of the new region of operation. Steps 312 and 314 may be further performed to monitor flowmeter 5 for potential changes in stiffness. This may allow an operator to only verify a flowmeter stiffness coefficient K when it is probable that the flowmeter stiffness has changed. Such changes may be due to factors such as erosion of a flow tube, corrosion of a flow tube, damage to the meter assembly 10, or changes in the process environment, for example.

Figure 3B:
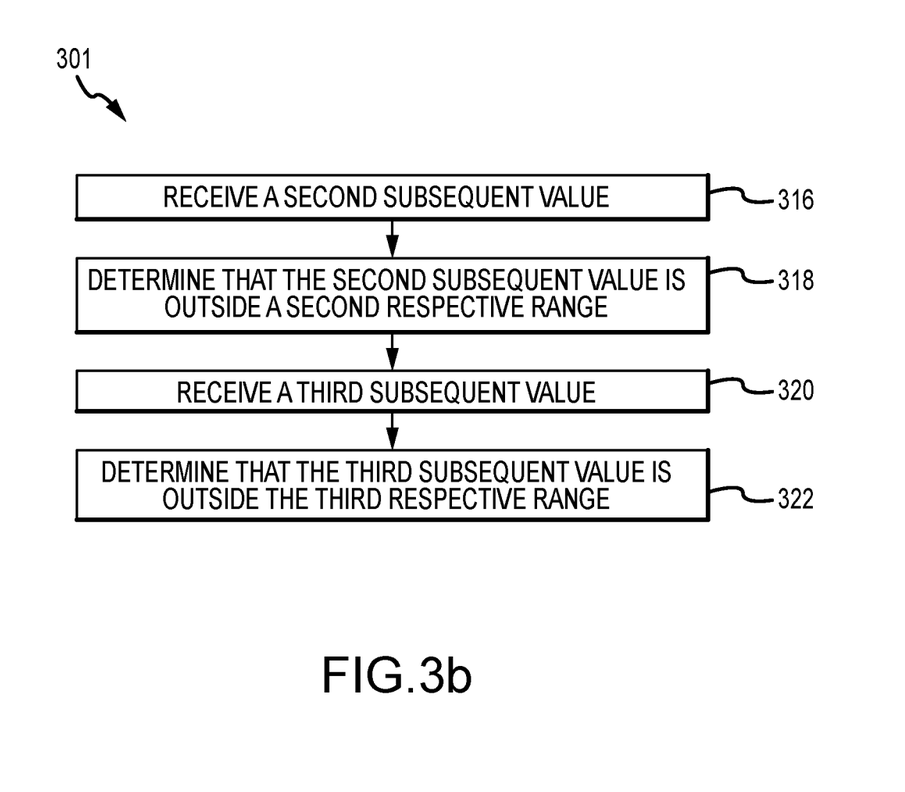
FIG. 3b depicts a flowchart depicting a method according to an example of the Application.

In examples, method 300 may further include any of the steps of method 301, depicted in FIG. 3b. Method 300 may further include steps 316 and 318, for example. In step 316, a second subsequent value 252 is received. The second subsequent value 252 comprises one of the subsequent temperature T 228, the subsequent response frequency ω 230, or the subsequent driver current I 232, the second subsequent value 252 being different from the first subsequent value 236. For example, if the first subsequent value 236 is the subsequent temperature T 228, then the second subsequent value 252 may be the subsequent response frequency ω 230.

In step 318, it may be determined whether the second subsequent value 252 is outside a second respective range 254. The second respective range 254 includes the values between a second respective average 256 minus a second respective threshold 250, and the second respective average 256 plus the second respective threshold 250. For example, if the second subsequent value 252 is the subsequent response frequency ω 230, the second respective average 256 is the average response frequency ω 216.

Steps 316 and 318 may allow an operator to restrict performing a flowmeter stiffness verification to circumstances where two out of three of the subsequent temperature T 228, the subsequent response frequency ω 230, or the subsequent driver current I 232 are outside a predetermined region of operation. In some examples, this may prevent the flowmeter from running a meter verification routine too frequently, or for only small excursions outside the region of operation.

If steps 316 and 318 are included in method 300, method 300 may further comprise steps 320 and 322. In step 320, a third subsequent value 262 may be received. The third subsequent value 262 comprises the subsequent temperature T 228, the subsequent response frequency ω 230, or the subsequent driver current I 232, the third subsequent value 262 being different from the first subsequent value 236 and the second subsequent value 252. For example, if the first subsequent value 236 is the subsequent temperature T 228, and the second subsequent value 252 is the subsequent response frequency ω 230, then the third subsequent value 262 may be the subsequent driver current I 232.

In step 322, it may be determined that the third subsequent value 262 is outside the third respective range 264. The third respective range 264 includes the values between a third respective average 266 minus a third respective threshold 260, and the third respective average 266 plus the third respective threshold 260. For example, if the third subsequent value 262 is the subsequent driver current I 232, then the third respective average 266 is the average driver current I 224.

Steps 320 and 322 may further allow an operator to restrict performing a flowmeter stiffness verification to circumstances where three out of three of the subsequent temperature T 228, the subsequent response frequency ω 230, or the subsequent driver current I 232 are outside a predetermined region of operation. In some examples, this may further prevent the flowmeter from running a meter verification routine too frequently, or for only small excursions outside the region of operation.

In examples, steps 302 or 324 may further comprise steps to determine the first and/or second stiffness coefficients 202 and 204. For example, method 300 may further comprise the steps of method 400 depicted in FIG. 4. Other methods of determining a stiffness coefficient K 202, 204 are possible, however, as will be understood by those of skill. For example, PCT patent publication WO 2007/040468, assigned to Micro Motion, Inc., the undersigned Applicants, describes several such methods.

Figure 4:
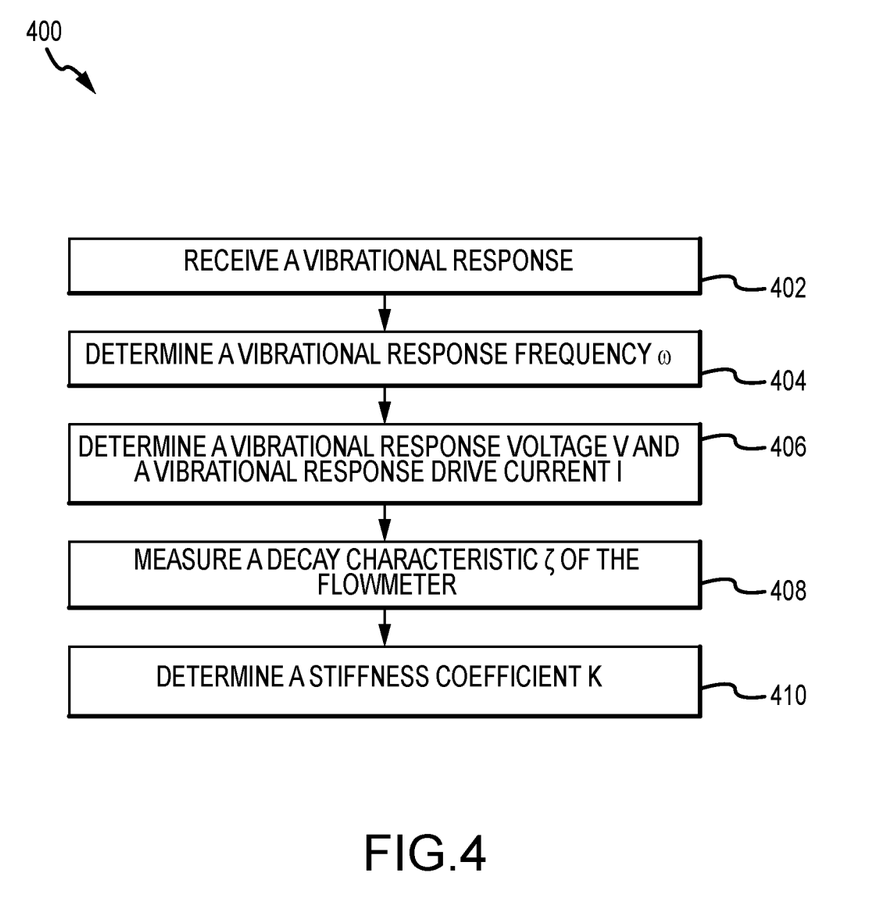
FIG. 4 depicts a flowchart depicting a method according to an example of the Application.

Method 400 begins with step 402. In step 402, a vibrational response 240 may be received. The vibrational response 240 is a response of the flow meter to a vibration at a substantially resonant frequency. The vibrational response 240 may be continuous or intermittent. A flow material may be flowing through the meter assembly 10 or may be static.

Method 400 continues with step 404. In step 404, a vibrational response frequency ω 242 may be determined. The vibrational response frequency ω 242 may be determined from the vibrational response 240 using any method, process, or hardware known to those of skill.

Method 400 continues with step 406. In step 406, a vibrational response voltage V 244 and a vibrational response drive current I 246 may be determined. The vibrational response voltage V 244 and vibrational response drive current I 246 may be obtained from an unprocessed or a conditioned vibrational response, as will be understood by those of skill.

Method 400 continues with step 408. In step 408, a decay characteristic 248 of the flowmeter may be determined. The damping characteristic may be measured by allowing the vibrational response of the flow meter to decay down to a vibrational target while measuring the decay characteristic. This decaying action may be performed in several ways. The drive signal amplitude may be reduced, the driver 180 may actually perform braking of the meter assembly 10 (in appropriate flow meters), or the driver 180 may be merely unpowered until the target is reached. In one embodiment, the vibrational target comprises a reduced level in a drive set point. For example, if the drive set point is currently at 3.4 mV/Hz, then for the damping measurement the drive set point may be reduced to a lower value, such as 2.5 mV/Hz, for example. In this manner, the meter electronics 20 may let the meter assembly 10 simply coast until the vibrational response 240 substantially matches this new drive target.

Method 400 continues with step 410. In step 410, a stiffness coefficient K 202, 204 may be determined. The stiffness coefficient K 202, 204 may be determined from the vibrational response frequency ω 242, the vibrational response voltage V 244, the vibrational response drive current I 246, and the decay characteristic 248. The stiffness coefficient K 202, 204 may be determined according to Equation (9), above.

Figure 5:
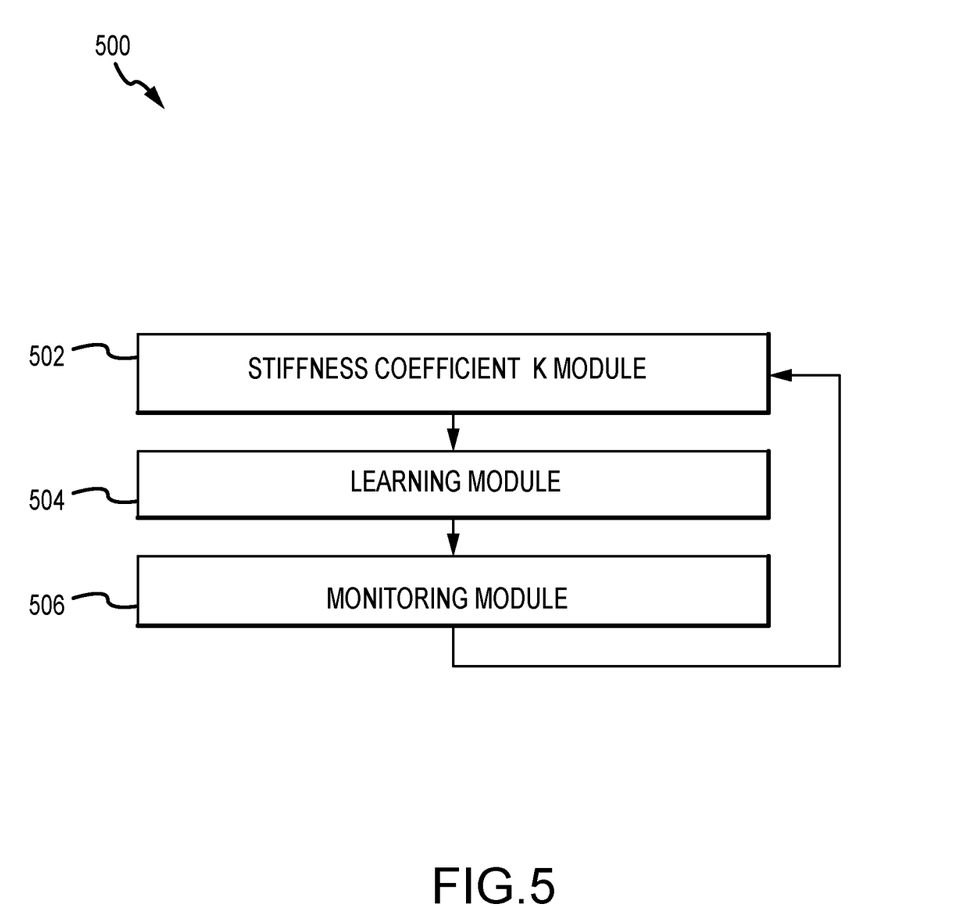
FIG. 5 depicts a flowchart depicting a system according to an example of the Application.

FIG. 5 depicts a system 500 in accordance with an embodiment. System 500 comprises a stiffness coefficient K module 502, a learning module 504, and a monitoring module 506.

The stiffness coefficient K module 502 may be used to determine the stiffness coefficients K 202, 204, as described above with respect to steps 302 and 324. In examples, the stiffness coefficient K module 502 may simply receive, store, and/or retrieve the stiffness coefficient K 202, 204. In further examples, however, the stiffness coefficient K module 502 may determine at least one of the stiffness coefficient K 202, 204. For example, the stiffness coefficient K module 502 may execute the steps of method 400.

The learning module 504 may be used to learn the present region of operation of a flow meter, as described above with respect to steps 304, 306, 308, and 310.

The monitoring module 506 may be used to determine whether a flowmeter is still within the region of operation correlated with the last determined stiffness coefficient K, as described above with respect to steps 312, 314, 316, 318, 320, and 322.

By using the method, meter electronics, or system described above, an operator may be able to verify a meter stiffness only when it is probable that the meter stiffness has changed. This may allow for the flowmeter to operate more efficiently and more accurately.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

We claim:

1. A method (300) for determining a flow meter stiffness coefficient K (202, 204) in a flowmeter (5) having connected meter electronics, the method (300) comprising:
   receiving a first flow meter stiffness coefficient K (202), and operating the flow meter using the first flow meter stiffness coefficient K (202);
   receiving a plurality of tube temperatures T (206), a plurality of tube vibrational response frequencies ω (208), and a plurality of driver currents I (210) by the meter electronics;
   determining an average tube temperature T (212) and a standard deviation tube temperature T (214) based on the plurality of tube temperatures T (206) by the meter electronics;
   determining an average tube vibrational response frequency ω (216) and a standard deviation tube vibrational response frequency ω (218) based on the plurality of tube vibrational response frequencies ω (208) by the meter electronics;

determining an average driver current I (224) and a standard deviation driver current I (226) based on the plurality of driver currents I (210) by the meter electronics;

receiving a first subsequent value (236) by the meter electronics, the first subsequent value (236) comprising a subsequent tube temperature T (228), a subsequent tube vibrational response frequency ω (230), or a subsequent driver current I (232); and upon determining that the first subsequent value (236) is outside a first respective range (237), by the meter electronics, defined between a first respective average (238) minus a first respective threshold (234), and the first respective average (238) plus the first respective threshold (234), initiating a determination of a second flow meter stiffness coefficient K (204), and operating the flow meter using the second flow meter stiffness coefficient K (204).

2. A method (300) as claimed in claim 1, wherein the plurality of tube temperatures T (206), the plurality of tube vibrational response frequencies ω (208), and the plurality of driver currents I (210) are determined concurrently with the determination of the first flow meter stiffness coefficient K (202).

3. A method (300) as claimed in claim 1, wherein the first respective threshold (234) comprises multiplying a first respective standard deviation (239) by a predetermined factor (268).

4. A method (300) as claimed in claim 3, further comprising:

receiving at least a second subsequent value (252), comprising the subsequent tube temperature T (228), the subsequent tube vibrational response frequency ω (230), or the subsequent driver current I (232), the second subsequent value (252) being different from the first subsequent value (236), and additionally determining that the second subsequent value (252) is outside a second respective range (254) defined between a second respective average (256) minus a second respective threshold (250), and the second respective average (256) plus the second respective threshold (250).

5. A method (300) as claimed in claim 4, further comprising:

receiving at least a third subsequent value (262) comprising the subsequent tube temperature T (228), the subsequent tube vibrational response frequency ω (230), or the subsequent driver current I (232), the third subsequent value (262) being different from the second subsequent value (252) and the first subsequent value (236), and additionally determining that the third subsequent value (262) is outside a third respective range (264) defined between a third respective average (266) minus a third respective threshold (260), and the third respective average (266) plus the third respective threshold (260).

6. A meter electronics (20) connected to a flowmeter (5), the meter electronics (20) comprising an interface (201) for receiving a tube vibrational response (240) from the flowmeter (5), and a processing system (203) in communication with the interface (201), with the processing system (203) configured to:

receive a first flow meter stiffness coefficient K (202), and operate the flow meter using the first flow meter stiffness coefficient K (202);

receive a plurality of tube temperatures T (206), a plurality of tube vibrational response frequencies ω (208), and a plurality of driver currents I (210) by the meter electronics;

determine an average tube temperature T (212) and a standard deviation tube temperature T (214) based on the plurality of tube temperatures T (206) by the meter electronics;

determine a subsequent tube vibrational response frequency ω (230) and a standard deviation tube vibrational response frequency ω (218) based on the plurality of tube vibrational response frequencies ω (208) by the meter electronics; and determine an average driver current I (224) and a standard deviation driver current I (226) based on the plurality of driver currents I (210) by the meter electronics;

receive a first subsequent value (236) by the meter electronics, the first subsequent value (236) comprising a subsequent tube temperature T (228), a subsequent tube vibrational response frequency ω (230), or a subsequent driver current I (232); and upon determining that the first subsequent value (236) is outside a first respective range (237) by the meter electronics defined between a first respective average (238) minus a first respective threshold (234), and the first respective average (238) plus the first respective threshold (234), initiate a determination of a second flow meter stiffness coefficient K (204), and operating the flow meter with the meter electronics using the second flow meter stiffness coefficient K (204).

7. A meter electronics (20) as claimed in claim 6, wherein the plurality of tube temperatures T (206), the plurality of tube vibrational response frequencies ω (208), and the plurality of driver currents I (210) are determined concurrently with the determination of the first flow meter stiffness coefficient K (202).

8. A meter electronics (20) as claimed in claim 6, wherein the first respective threshold (234) comprises multiplying a first respective standard deviation (239) by a predetermined factor (268).

9. A meter electronics (20) as claimed in claim 6, wherein the processing system (203) is further configured to:

receive at least a second subsequent value (252) comprising the subsequent tube temperature T (228), the subsequent tube vibrational response frequency ω (230), or the subsequent driver current I (232), the second subsequent value (252) being different from the first subsequent value (236), and wherein determining that the first subsequent value (236) is outside the first respective range (237) further comprises determining that the second subsequent value (252) is outside a second respective range (254) defined between a second respective average (256) minus a second respective threshold (250), and the second respective average (256) plus the second respective threshold (250).

10. A meter electronics (20) as claimed in claim 9, wherein the processing system (203) is further configured to:

receive at least a third subsequent value (262) comprising the subsequent tube temperature T (228), the subsequent tube vibrational response frequency ω (230), or the subsequent driver current I (232), the third subsequent value (262) being different from the second subsequent value (252) and the first subsequent value (236), and wherein determining that the first subsequent value (236) is outside the first respective range (237) further comprises determining that the third subsequent value (262) is outside a third respective range (264) defined between a third respective average (266) minus a third respective threshold (260), and the third respective average (266) plus the third respective threshold (260).

11. A meter electronics (20), as claimed in claim 6, wherein at least a first of receiving the first flow meter stiffness coefficient K (202) and initiating the determination of the second flow meter stiffness coefficient K (204) further comprises:
- receiving a tube vibrational response (240) from the flowmeter (5), with the tube vibrational response (240) comprising a response to a vibration of the flowmeter (5) at a substantially resonant frequency;
- determining a tube vibrational response frequency $\omega$ (242);
- determining a tube vibrational response voltage V (244) and a tube vibrational response drive current I (246);
- measuring a decay characteristic $\zeta$ (248) of the flowmeter (5); and
- determining a flow meter stiffness coefficient K (202, 204) from the tube vibrational response frequency $\omega$ (242), the tube vibrational response voltage V (244), the tube vibrational response drive current I (246), and the decay characteristic $\zeta$ (248).

* * * * *

UNITED STATES PATENT AND TRADEMARK OFFICE
CERTIFICATE OF CORRECTION

| | | |
|---|---|---|
| PATENT NO. | : 11,852,516 B2 | Page 1 of 1 |
| APPLICATION NO. | : 17/264458 | |
| DATED | : December 26, 2023 | |
| INVENTOR(S) | : Craig B. McAnally et al. | |

It is certified that error appears in the above-identified patent and that said Letters Patent is hereby corrected as shown below:

In the Specification

Column 4, Lines 24 and 28, and Column 14, Line 6, replace "decay characteristic" with --decay characteristic $\zeta$--

Column 9, Line 1, replace "AK" with --$\Delta K$--

Signed and Sealed this
Eleventh Day of February, 2025

Coke Morgan Stewart
*Acting Director of the United States Patent and Trademark Office*